United States Patent
Ohmori et al.

(10) Patent No.: US 10,862,134 B2
(45) Date of Patent: *Dec. 8, 2020

(54) SOLID OXIDE FUEL CELL

(71) Applicant: NGK INSULATORS, LTD., Nagoya (JP)

(72) Inventors: Makoto Ohmori, Nagoya (JP); Ayano Kobayashi, Nagoya (JP); Shinji Fujisaki, Kuwana (JP)

(73) Assignee: NGK INSULATORS, LTD., Nagoya (JP)

( * ) Notice: Subject to any disclaimer, the term of this patent is extended or adjusted under 35 U.S.C. 154(b) by 40 days.

This patent is subject to a terminal disclaimer.

(21) Appl. No.: 16/037,366

(22) Filed: Jul. 17, 2018

(65) Prior Publication Data

US 2018/0323440 A1 Nov. 8, 2018

Related U.S. Application Data

(60) Division of application No. 14/304,434, filed on Jun. 13, 2014, now Pat. No. 10,056,620, which is a (Continued)

(30) Foreign Application Priority Data

Dec. 19, 2011 (JP) .................................. 2011-277507
Feb. 17, 2012 (JP) .................................. 2012-033102
Sep. 14, 2012 (WO) .................. PCT/JP2012/073682

(51) Int. Cl.
*H01M 8/0217* (2016.01)
*H01M 4/86* (2006.01)
(Continued)

(52) U.S. Cl.
CPC ......... *H01M 4/8663* (2013.01); *B01J 23/002* (2013.01); *B01J 23/83* (2013.01);
(Continued)

(58) Field of Classification Search
CPC .......................... H01M 4/9033; H01M 8/0217
See application file for complete search history.

(56) References Cited

U.S. PATENT DOCUMENTS 9,520,597 B2   12/2016  Ohmori et al.
2002/0086189 A1  7/2002  Pham et al.
(Continued)

FOREIGN PATENT DOCUMENTS

EP   2410598 A1   1/2012
JP   9-92302 A    4/1997
(Continued)

OTHER PUBLICATIONS

The Japanese Office Action and its partial English translation for the corresponding Japanese patent application No. 2012-033102 dated May 15, 2012.
(Continued)

*Primary Examiner* — James Lee
(74) *Attorney, Agent, or Firm* — Global IP Counselors, LLP

(57) ABSTRACT

A solid oxide fuel cell includes a cathode including a complex oxide having a perovskite structure expressed by the formula $ABO_3$, an anode, and a solid electrolyte layer disposed between the cathode and the anode. The cathode includes phosphorus, chromium and boron, a content amount of the phosphorus in the cathode is at least 10 ppm and no more than 50 ppm, a content amount of the chromium in the cathode is at least 50 ppm and no more than 500 ppm, and a content amount of the boron in the cathode is at least 5 ppm and no more than 50 ppm.

7 Claims, 5 Drawing Sheets
(2 of 5 Drawing Sheet(s) Filed in Color)

Related U.S. Application Data continuation of application No. PCT/JP2012/082357, filed on Dec. 13, 2012.

(51) Int. Cl.
    *B01J 23/00*     (2006.01)
    *B01J 23/83*     (2006.01)
    *B01J 35/00*     (2006.01)
    *C04B 35/01*     (2006.01)
    *C04B 35/26*     (2006.01)
    *H01M 4/90*     (2006.01)
    *H01M 8/0202*     (2016.01)
    *B01J 27/188*     (2006.01)
    *H01M 8/124*     (2016.01)

(52) U.S. Cl.
    CPC ........... *B01J 35/0033* (2013.01); *C04B 35/01* (2013.01); *C04B 35/26* (2013.01); *H01M 4/9033* (2013.01); *H01M 8/0217* (2013.01); *B01J 27/188* (2013.01); *B01J 2523/00* (2013.01); *C04B 2235/3213* (2013.01); *C04B 2235/3227* (2013.01); *C04B 2235/3275* (2013.01); *C04B 2235/3279* (2013.01); *C04B 2235/5436* (2013.01); *C04B 2235/5445* (2013.01); *C04B 2235/72* (2013.01); *C04B 2235/725* (2013.01); *C04B 2235/727* (2013.01); *C04B 2235/768* (2013.01); *H01M 8/0202* (2013.01); *H01M 2008/1293* (2013.01); *Y02E 60/50* (2013.01)

(56) References Cited

U.S. PATENT DOCUMENTS

| | | |
|---|---|---|
| 2004/0018298 A1 | 1/2004 | Pham et al. |
| 2008/0124598 A1 | 5/2008 | Backhaus-Ricoult et al. |
| 2009/0280376 A1 | 11/2009 | Chiba et al. |
| 2011/0198216 A1 | 8/2011 | Larsen et al. |

FOREIGN PATENT DOCUMENTS

| | | |
|---|---|---|
| JP | 2000-251533 A | 9/2000 |
| JP | 2001-297783 A | 10/2001 |
| JP | 2003-308846 A | 10/2003 |
| JP | 2004-265746 A | 9/2004 |
| JP | 2004-273143 A | 9/2004 |
| JP | 2006-32132 A | 2/2006 |
| JP | 2009-48917 A | 3/2009 |
| JP | 2011-190148 A | 9/2011 |
| JP | 2012-43774 A | 3/2012 |
| JP | 2012-138256 A | 7/2012 |
| JP | 5140787 B1 | 11/2012 |
| WO | 2007/061043 A | 5/2007 |

OTHER PUBLICATIONS

The Japanese Office Action and its partial English translation for the corresponding Japanese patent application No. 2012-033102 dated Jul. 3, 2012.

The Japanese Office Action and its partial English translation for the Japanese patent application No. 2013-519673 dated Jul. 16, 2013.

The Japanese Office Action and its partial English translation for the Japanese patent application No. 2013-092900 dated Jul. 16, 2013.

The extended European search report for the corresponding European application No. 17185353.4 dated Feb. 23, 2018.

The extended European search report for the corresponding European application No. 12860994.8 dated Nov. 11, 2015.

Bucher et al., "Transport properties of La0.6CoO3-delta," Solid State Ionics, May 1, 2001, pp. 375-380, vol. 141-142, North Holland Pub. Company, Amsterdam, NL.

The extended European search report for the corresponding European application No. 12859479.3 dated May 26, 2015.

International Preliminary Report on Patentability for the corresponding international application No. PCT/JP2012/082357 dated Jun. 24, 2014.

Simner et al. "Degradation Mechanisms of La—Sr—Co—Fe—O3 SOFC Cathodes" Electrochemical and Solid-State Letters 9 (2006); A478-A481. Aug. 17, 2006.

Final Office Action for the corresponding U.S. Appl. No. 13/616,905 dated Mar. 29, 2016.

ically-striped fuel cell;
SOLID OXIDE FUEL CELL

CROSS-REFERENCE TO RELATED APPLICATIONS

This application is a continuation application of the U.S. application Ser. No. 14/304,434 filed on Jun. 13, 2014, which is a continuation application of International Application No. PCT/JP2012/082357, filed Dec. 13, 2012, which claims priority to Japanese Patent Application No. 2011-277507 filed in Japan on Dec. 19, 2011, Japanese Patent Application No. 2012-033102 filed in Japan on Feb. 17, 2011, and International Application No. PCT/JP2012/073682, filed Sep. 14, 2012, the contents of each of which are hereby incorporated herein by reference.

BACKGROUND

Field of the Invention

The present invention relates to a solid oxide fuel cell.

Background Information

In recent years, several materials and structures have been proposed in relation to fuel cell batteries due to the attention focused on fuel cell batteries in light of effective use of energy resources and environmental problems.

JPA-2006-32132 discloses the use of an LSCF powder as a raw material powder for the cathode of a solid oxide fuel cell (SOFC).

SUMMARY

However, the available voltage may be reduced during repeated power generation using the fuel cell. The present inventors gained insight that one cause of this reduction in output is deterioration of the cathode.

The technique disclosed herein is based on this insight and addresses the problem of providing a solid oxide fuel cell that inhibits deterioration of a cathode.

The present invention solves the above problem and as a realizes that the deterioration of a cathode can be suppressed by increasing the uniformity of the concentration of the cathode components.

In that contest, the solid oxide fuel cell disclosed herein includes a cathode, an anode and a solid electrolyte disposed between the cathode and the anode. The cathode contains a complex oxide having a perovskite structure expressed by the general formula $ABO_3$. The standard deviation value of the atomic percentage of each element in the A site measured at the sectional surface of the cathode using energy dispersive X-ray spectroscopy at 10 spots in a single field is no more than 10.4.

The technique disclosed herein provides a solid oxide fuel cell that enables suppression of deterioration of a cathode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the attached drawings which form a part of this original disclosure.

DETAILED DESCRIPTION OF PREFERRED EMBODIMENTS

1. Electrode Material

Figure 1:
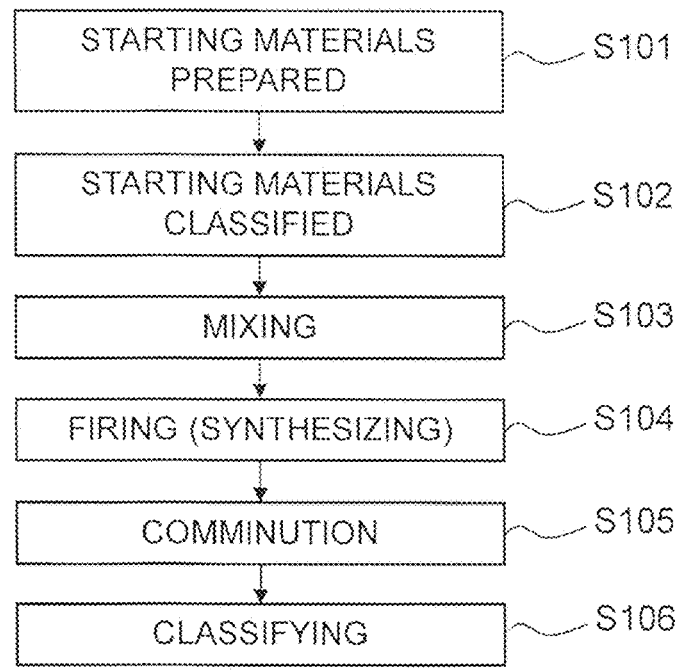
FIG. 1 is a flowchart describing a method of manufacturing an electrode material using a solid-phase method.

The electrode material includes a complex oxide having a perovskite structure. The electrode material may include components other than a complex oxide. As described below, the electrode material according to the present embodiment is suitably used as a material to configure the cathode of the solid oxide fuel cell.

The composition of the complex oxide is expressed by the general formula $ABO_3$. Furthermore, at least one of La and St may be contained in the A site. An actual example of this type of complex oxide for use as a cathode material includes LSCF, that is to say, $(La, Sr)(Co, Fe)O_3$, LSF that is to say, $(La, Sr)FeO_3$, LSC that is to say, $(La, Sr)CoO_3$, LNF that is to say, $La(Ni, Fe)O_3$, SSC that is to say, $(Sm, Sr)CoO_3$, and the like. These complex oxides are materials that combine characteristics related to oxygen ion conductivity and electron conductivity, and are termed mixed conducting materials.

The electrode material may include the complex oxide as a "principal component". The feature "include as a principal component" when a composition X contains a material Y means that the material Y comprises preferably at least 60 wt % overall of composition X, more preferably 70 wt %, and still more preferably at least 90 wt % of the overall composition X.

Furthermore, the electrode material may be configured as a powder (for example, with an average particle diameter of about 1 micrometer to 5 micrometers) or a disintegrated product (for example, with an average particle diameter of about 5 micrometers to 500 micrometers), or may be a agglomerate that is larger than the disintegrated product.

The electrode material preferably includes a highly uniform composition distribution. More specifically, a value of the standard deviation for the atomic percentage of respective elements contained at the A site are acquired by use of energy dispersive X-ray spectroscopy (EDS) at 10 spots in an arbitrary field in the electrode material is preferably no more than 10.3. Furthermore, the atomic percentage of the respective elements contained at the B site is acquired, and when the standard deviation of the atomic percentage is calculated, the standard deviation at the B site is preferably no more than 5.03.

For example, it is assumed that n types of elements A1, A2, A3, . . . An are contained at the A site. When the value of the standard deviation for the atomic percentage of the respective elements is acquired, with reference to the atomic percentage obtained at 10 spots, if the value of the standard deviation for the atomic percentage for the element A1 is larger than the respective values for the standard deviation of the elements A2-An, it is preferred that the value of the standard deviation of the element A1 is no more than 10.3.

The arbitrary field as used herein is suitably within a range observed by an electron microscope such as an electron probe micro analyzer (EPMA) or a scanning electron microscope (SEM), or the like with a magnification of 100 times to 5000 times. The analysis spot size of the respective 10 spots may be no more than 1 micrometer. When the distribution of the atomic percentage as described below is evaluated based on an observation at an excessively small magnification of less than 100 times, there are difficulties associated with the determination of the uniformity of the distribution of each element in the micro range that is the object of the present invention. On the other hand, when the distribution of the atomic percentage is evaluated based on an observation at an excessively large magnification that exceeds 5000 times, there is an increased possibility that only a nonuniform region or only a uniform region will be observed as a result of the narrow observation range. As a result, as stated above, it is preferred that the magnification of the electron microscope is in the range of 100 times to 5000 times.

The position of the 10 spots may be selected for example on the basis of the concentration level in 10 stages that are determined in response to the distribution of the atomic percentages measured using an electron probe micro analyzer (EPMA). The concentration level in the 10 stages is preferably set with reference to substantially the entire range of the distribution of the atomic percentages. For example, the concentration level in the 10 stages can be set by creating 10 divisions in the interval between the maximum value and the minimum value in the characteristic X-ray intensity in the arbitrary field.

The ideal unit lattice for the complex oxide having a perovskite structure expressed by the general formula $ABO_3$ is in the shape of a cube. An A element is disposed at the corner of the unit lattice, and a B element is disposed in the body center of the unit lattice. The oxygen element is disposed at the face center of the unit lattice. In the present embodiment, the position of the corner of the unit lattice at which the A element is disposed is termed the "A site", and the position of the corner of the unit lattice at which the B element is disposed is termed the "B site".

2. Method of Manufacturing Electrode Material

An example of a method of manufacturing the electrode material described in "Section 1." above will be described below.

More specifically, the method of manufacture includes acquisition of a complex oxide compound having a perovskite structure.

The method of obtaining the complex oxide compound includes a solid phase method, a liquid phase method (citrate process, Pechini method, co-precipitation method) or the like.

A "solid phase method" refers to a method in which a mixture obtained by mixing a starting material (powder) including constituent elements at a predetermined ratio is fired, and then subjected to comminution to obtain the target material.

A "liquid phase method" is a method for obtaining a target material that includes the steps of dissolving a starting material including constituent elements into a solution, obtaining a precursor of the target material from the solution by precipitation or the like, and then performing drying, firing and comminution.

The sequence of steps will be described below making reference to the figures in relation to a configuration in which the electrode material is manufactured using a solid phase method, and a configuration in which the electrode material is manufactured using a liquid phase method.

2-1 Method of Manufacturing Electrode Materials Using Solid Phase Method

FIG. 1 is a flowchart describing a method of manufacturing an electrode material using a solid phase method.

Firstly in a step S101, a starting material is prepared according to the type of complex oxide. When manufacturing LSCF as a complex oxide, for example, $La_2O_3$, $SrCO_3$, $Co_3O_4$ and $Fe_2O_3$ are prepared. The average particle diameter of $La_2O_3$ may be 0.1 micrometer to 0.7 micrometer, the average panicle diameter of $SrCO_3$ may be 0.1 micrometer to 0.5 micrometer, the average particle diameter of $CO_3O_4$ may be 0.1 micrometer to 1.0 micrometer, and the average particle diameter of $Fe_2O_3$ may be 0.1 micrometer to 0.8 micrometer. Furthermore, it is preferred that the particle size distribution of the starting material is controlled. More specifically, it is desirable that coarse particles of greater than or equal to 20 micrometers are removed in advance by use of an air classifier or the like. The removal of coarse particles is effective for uniformity when executing mixing and synthesizing in subsequent steps.

Next, in step S102, the starting materials are classified. More specifically, for example, the specific surface area of each starting material is adjusted by classification using an air classifier or example. When manufacturing LSCF as a complex oxide, the specific surface area of $La_2O_3$ is adjusted to 1 $m^2/g$ to 5 $m^2/g$, the specific surface area of $SrCO_3$ is adjusted to 1 $m^2/g$ to 7 $m^2/g$, the specific surface area of $Co_3O_4$ is adjusted to 1 $m^2/g$ to 7 $m^2/g$, and the specific surface area of $Fe_2O_3$ is adjusted to 1 $m^2/g$ to 10 $m^2/g$.

Next, in a step S103, the respective starting materials are mixed at a predetermined mixing ratio. In the present embodiment, the mixing process preferably includes the steps of weighing the respective starting materials at a predetermined mixing ratio and placing the materials into a pot mill together with pebbles (for example, application is possible of the pebbles used in the manufacture of zirconia or alumina), rotating the pot mill for a predetermined time (10 hrs to 120 hrs) in a dry state and then introducing a predetermined amount (weight ratio relative to the starting material of 50% to 200%) of solvent (for example, when using an aqueous solvent, ion-exchanged water may be used, and when using a solvent-based material, acetone may be used), and rotating the pot mill further for a predetermined time (10 hr to 300 hr) in a wet state. When performing a uniform mixture of respective starting material powders using wet mixing, it is preferred to perform sufficient disintegration under suitable mixing conditions of the starting material powder using dry mixing. The pebbles preferably have a diameter of 0.5 mm to 5 mm, and are preferably adjusted to 0.5 to 3 times the weight of the starting material powder.

In this mixing process, it is preferred to add a predetermined additive to the respective starting materials. The additives are phosphorus (P), chrome (Cr), and boron (B). The added amount of P is preferably at least 1 ppm to no more than 50 ppm in a weight ratio relative to the starting materials, and more preferably at least 1 ppm and no more than 30 ppm. The added amount of Cr is preferably at least 1 ppm to no more than 500 ppm in a weight ratio relative to the starting materials, and more preferably at least 1 ppm and no more than 100 ppm. The added amount of B is preferably at least 1 ppm to no more than 50 ppm in a weight ratio relative to the starting materials, and more preferably at least 1 ppm and no more than 10 ppm. The additives are preferably added as oxides. The additives have the function of creating a uniform dispersion and mixture in the constituent components. In addition to comminution of the starting materials in a dry mix in the previous step, an important factor in the control (uniformity) of the composition distribution of the electrode material is the combination of a process of wet mixing in later steps. The mixing ratio of each starting material when manufacturing LSCF as a complex-oxide may be performed by adjusting the starting material ratio of $La_2O_3$, $SrCO_3$, $Co_3O_4$ and $Fe_2O_3$ in accordance with the composition of the complex oxide.

Next, in step S104, the electrode material is synthesized by firing of the starting materials mixed in the pot mill. The synthesis conditions may be suitably adjusted within a range of a synthesis temperature of 900 degrees C. to 1400 degrees C. and a synthesis time of 1 to 30 hrs in an oxidizing atmosphere.

Next, in step S105, the electrode material in a synthesized agglomerated configuration is subjected to comminution. More specifically, the average particle diameter of the electrode material is adjusted to 0.3 micrometers to 1.2 micrometers by introducing the electrode material with pebbles (for example, application is possible of the pebbles used in the manufacture of zirconia or alumina) into the pot mill and rotating for a predetermined time (5 hrs to 20 hrs). Furthermore, prior to comminution, the electrode material in an agglomerated configuration may be subjected to preparatory disintegration.

Next, in step S106, the electrode material after comminution is classified. More specifically, the specific surface area of each starting material is adjusted by classification using an air classifier or the like. When manufacturing LSCF as a complex oxide, the specific surface, area is adjusted to 3 $m^2/g$ to 12 $m^2/g$.

2-2 Method of Manufacture of Electrode Material Using Liquid-Phase Method

Figure 2:
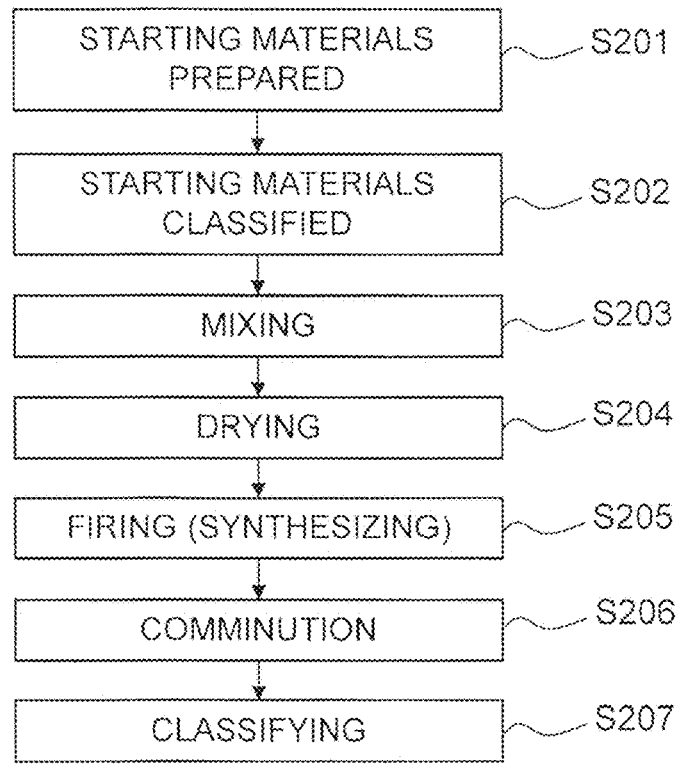
FIG. 2 is a flowchart describing a method of manufacturing an electrode material using a liquid-phase method.

FIG. 2 is a flowchart describing a method of manufacturing an electrode material using a liquid-phase method.

Firstly, in step S201, a starting material is prepared corresponding to the type of complex oxide. When manufacturing LSCF as the complex oxide by use of a co-precipitation method or citrate method, $La(NO_3)_3 \cdot 6H_2O$, $Sr(NO_3)_2$, $Co(NO_3)_3 \cdot 9H_2O$ and $Fe(NO_3)_3 \cdot 9H_2O$ are prepared. The average particle diameter of $La(NO_3)_3 \cdot 6H_2O$ may be 0.3 micrometers to 0.6 micrometers, the average particle diameter of $Sr(NO_3)_2$ may be 0.1 micrometers to 0.4 micrometers, the average particle diameter of $Co(NO_3)_3 \cdot 9H_2O$ may be 0.2 micrometers to 0.5 micrometers, and the average particle diameter of $Fe(NO_3)_3 \cdot 9H_2O$ may be 0.3 micrometers to 0.8 micrometers. When manufacturing LSCF using a Pechini method, $La_2O_3$, $SrO_3$, $CO_3O_4$ and $Fe(NO_3)_3 \cdot 9H_2O$ are prepared to have the above average particle diameter. Furthermore, controlling the particle size distribution of the starting materials is important. More specifically, it is desirable to remove coarse particles of greater than or equal to 15 micrometers in advance by use of an air classifier. The removal of coarse particles is effective for uniformity when executing mixing and synthesizing (calcinating) in subsequent steps.

Next, in step S202, the starting materials are classified. More specifically, for example, the specific surface area of each starting material is adjusted by classification using an air classifier. When manufacturing LSCF as a complex oxide by use of co-precipitation or a citrate method, the specific surface area of $La(NO_3)_3 \cdot 6H_2O$ is adjusted to 2 $m^2/g$-8 $m^2/g$, the specific surface area of $Sr(NO_3)_2$ is adjusted to 1 $m^2/g$-5 $m^2/g$, the specific surface area of $Co(NO_3)_3 \cdot 9H_2O$ is adjusted, to 2 $m^2/g$-5 $m^2/g$, and the specific surface area of $Fe(NO_3)_3 \cdot 9H_2O$ is adjusted to 3 $m^2/g$-10 $m^2/g$.

Next, in a step S203, the respective starting materials are mixed at a predetermined mixing ratio. More specifically, when manufacturing LSCF by use of co-precipitation, after dissolving the starting materials in a pure state to prepare a 0.2M aqueous solution, an aqueous nitrate solution is added while stirring in a precipitation agent. When preparing the LSCF using a citrate method, the respective starting materials are dissolved in a pure state and citric acid is added until all the metal is precipitated, and the viscosity is adjusted by use of heating after immersion to approximately 60 degrees C. to dehydrate. When preparing LSCF using a Pechini method, after preparing an aqueous nitrate solution for each of the starting materials and mixing all solutions, citric acid and ethylene glycol are added.

In this mixing process, it is preferred to add a predetermined additive to the respective starting materials. The additives are phosphorus (P), chrome (Cr), and boron (B). The concentration of P contained in the additive is preferably at least 1 ppm to no more than 50 ppm in a weight ratio relative to the starting materials, and more preferably at least 1 ppm and no more than 30 ppm. The concentration of Cr contained in the additive is preferably at least 1 ppm to no more than 500 ppm in a weight ratio relative to the starting materials, and more preferably at least 1 ppm and no more than 100 ppm. The concentration of B contained in the additive is preferably at least 1 ppm to no more than 50 ppm in a weight ratio relative to the starting materials, and more preferably at least 1 ppm and no more than 10 ppm. The additives have the function of creating a uniform dispersion and mixture in the constituent, components, or during thermal synthesis processes, and non-uniformity in each of the dements (for example, resulting from phase splitting, heterogeneous phase precipitation, or the like) can be inhibited as a result of these additives. As a result, uniformity of the composition distribution of the electrode material is enabled by suitable control of the added amount of the additives.

Next, in step S204, the aqueous solution prepared in step S203 is dried. When using co-precipitation, vacuum drying is used at approximately 110 degrees C., when using a citrate method, drying is performed at approximately 70 degrees C., and when using a Pechini method, drying is performed at approximately 200 degrees C.

Next, in step S205, the electrode material is synthesized by firing of the dried starting materials. The synthesis conditions are suitably adjusted within a range of a synthesis temperature of 900 degrees C. to 1400 degrees C. and a synthesis time of 1 to 30 hrs in an oxidizing atmosphere.

Next, in step S206, the electrode material that is in a configuration of a synthesized agglomerate is subjected to comminution. In step S207, the electrode material after comminution is classified. The details of these steps are the same as steps S105 and S106 described above.

3. Vertically-Striped Fuel cell (Solid Oxide Fuel Cell)

A solid oxide fuel cell is an example of a fuel cell. In particular, a SOFC will be mainly described that has a cell stack structure in which a plurality of fuel cells are stacked.

3.1 Overview of Fuel Cell

Figure 3:
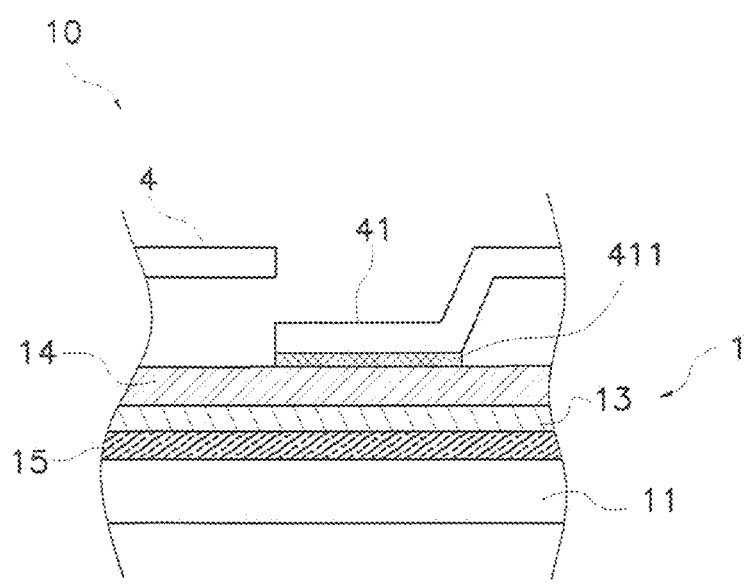
FIG. 3 is a sectional view illustrating the principal features of configuration of a vertically-striped fuel cell.

As illustrated in FIG. 3, the fuel cell 10 includes a fuel cell (hereinafter simply referred to as "cell") 1, and a current collecting member 4.

3-2 Overview of Cell 1

The cell 1 is a thin ceramic plate. The thickness of the cell 1 is for example 30 micrometers to 700 micrometers, and the diameter of the cell 1 is for example 5 mm to 50 mm. The cell 1 as illustrated in FIG. 3 includes an anode 11, a barrier layer 13, a cathode 14, and an electrolyte layer 15 (solid electrolyte layer).

3-3 Anode

The material used in the anode 11 for example includes a material used in the formation of the anode in a known fuel cell. More specifically, the material used in the anode 11 may include NiO—YSZ (nickel oxide-yttria-stabilized zirconia) and/or NiO—$Y_2O_3$ (nickel oxide-yttria). The anode 11 may include these materials as a main component. The anode 11 functions as the anode.

Furthermore, the anode 11 may function as a base plate that supports the other layers included in the cell 1 (in other words, a support body). That is to say, the thickness of the anode 11 may have the maximum thickness of the plurality of layers contained in the cell 1. More specifically, the thickness of the anode 11 is of the order of 10 micrometers to 600 micrometers.

The anode 11 can be imparted with conductive properties by application of a reduction treatment (for example, a treatment of reducing NiO to Ni).

The anode 11 may include at least two layers. For example, the anode 11 may have two layers, that is to say, a base plate and an anode-active layer (fuel-side electrode) formed thereon. The material in the base plate is configured by a material that includes properties such as electron conductivity. The anode-active layer is configured by a material that includes properties such as electron conductivity and properties such as oxidizing ion (oxygen ion) conductivity. The "proportion of the volume of material that has oxidizing ion (oxygen, ion) conductivity relative to the total volume excluding the pores" in the anode active layer is greater than the "proportion of the volume of material that has oxidizing ion (oxygen ion) conductivity relative to the total volume excluding the pores" in the base plate. The material in the base plate and the anode active layer can be selected from the materials for the anode 11 described above. More specifically, a combination is possible of a base plate configured from NiO—$Y_2O_3$ and the anode active layer configured by NiO—YSZ.

3-4 Barrier Layer

The barrier layer 13 is provided between the cathode 14 and the anode 11, and more specifically, is provided between the cathode 14 and the electrolyte layer 15.

The barrier layer 13 includes cerium. The barrier layer may include cerium as the ceria (cerium, oxide). More specifically, materials that are used in the barrier layer 13 include ceria and ceria-based materials including rare-earth metal oxides configured as a solid solution in ceria. The barrier layer 13 may include a ceria-based material as a main component.

More specifically, the ceria-based material includes GDC ((Ce, Gd)$O_2$: gadolinium doped ceria), and SDC ((Ce, Sm)$O_2$: samarium doped ceria). The concentration of the rare earth metal in the ceria-based material is preferably 5 to 20 mol. %. The barrier layer 13 may include an additive in addition to a ceria-based material.

The thickness of the barrier layer 13 is no more than 30 micrometers.

The harrier layer 13 suppresses the diffusion of cations from the cathode 14 into the electrolyte layer 15. As a result, the barrier layer 13 enables suppression of a reduction in the output density, and increases the product life of the cell 1.

3-5 Cathode

The cathode 14 contains a complex oxide having a perovskite structure expressed by the general formula $ABO_3$. This type of complex oxide is preferably the electrode material that was described in Section 1 above. More specifically, the complex oxide includes LSCF, LSF, LSC, LNF, SSC, or the like. The cathode 14 may include components other than the above types of complex oxide. For example, the cathode 14 may be configured as a composite with the material (ceria or zirconia, or the like) of the electrolyte layer 15 described below.

As used herein the composition distribution of the cathode 14 is preferably exhibits a highly uniform configuration. More specifically, in an arbitrary field on a sectional surface of the cathode 14, the respective atomic percentages of each element contained at the A site is acquired using EDS at 10 spots, and when the standard deviation of the atomic percentage is calculated, it is preferred that the standard deviation value of the A site is no more than 10.4. For example, it is assumed that n types of elements A1, A2, A3, . . . An are present at the A site. When the standard deviation value of the atomic percentage of each element is acquired based on the atomic percentage obtained at 10 spots, it is preferred that the standard deviation value of the atomic percentage of element A1, and the standard deviation value of the atomic percentage of the element A1 when larger than the standard deviation value respectively of A2 to An is no more than 10.4.

However, when the cathode 14 contains a component other than the complex oxide, the standard deviation of the atomic percentage of the elements contained at the A site of the complex oxide may be more no more than 10.4. Therefore, when the cathode 14 is configured from a composite of the material of the electrolyte layer 15 and the complex oxide, only the complex oxide that is present on the sectional surface of the cathode 14 may be selected and observed.

An arbitrary field be defined as the range that can be observed at a magnification of 100× to 5000× when using an electron microscope such as an SEM, EPMA, or the like. The analysis spot size of the respective 10 spots max have a configuration of less than or equal to 1 micron. Furthermore, the position of the 10 spots may be selected in response to the concentration level of the 10 stages for example set based on the distribution of tire atomic percentage measured using EPMA. In other words, the concentration level in the 10 stages may be set by dividing into 10 the interval between the maximum value and the minimum value of the specific X-ray intensity in an arbitrary field.

The cathode 14 is preferably includes an additive (P, Cr, and B) at a predetermined weight ratio relative to the total weight of the electrode material. In this configuration, the content amount of P is preferably at least 1 ppm to no more than 50 ppm in a weight ratio relative to the starting materials, and more preferably at least 1 ppm and no more than 30 ppm. The content amount of Cr is preferably at least 1 ppm to no more than 500 ppm in a weight ratio relative to the starting materials, and more preferably at least 1 ppm and no more than 100 ppm. The content amount of B is preferably at least 1 ppm to no more than 50 ppm in a weight ratio relative to the starting materials, and more preferably at least 1 ppm and no more than 10 ppm.

The cathode 14 may include additives other than P, Cr and Br and for example, the cathode 14 may include trace amounts of Na, Mg, Al, Si, Ca, Sc, Ti, Ni, Zn, Y, Zr, Ba, Ce, Gd, or the like.

The thickness of the cathode 14 may be of the order of 5 micrometers to 50 micrometers.

3-6 Electrolyte Layer

The electrolyte layer 15 is provided between the barrier layer 13 and the anode 11.

The electrolyte layer 15 includes zirconium. The electrolyte layer 15 may include zirconium in the form of zirconia ($ZrO_2$). More specifically, the electrolyte layer 15 may include zirconia as a main component. The electrolyte layer 15 may include an additive such as $Y_2O_3$ and/or $Sc_2O_3$ in addition to zirconia. These additives may function as a stabilizer. The added amount of the additive in the electrolyte layer 15 is of the order of 3 to 20 mol %. In other words, the material used in the electrolyte layer 15 includes yttria-stabilized zirconia such as 3YSZ, 8YSZ, and 10YSZ or zirconia-based materials such as ScSZ (scandia-stabilized zirconia).

The thickness of the electrolyte layer 15 may be no more than 30 micrometers.

3-7 Current Collecting Member

A current collecting member 4 includes a plurality of conductive connection portions 41.

As illustrated in FIG. 3, the conductive connection portions 41 are configured as a depressed portion provided in the current collecting member 4, and the bottom portion thereof is connected through a conductive adhesive 411 to the cathode 14. The bottom portion of the conductive connection portions 411 includes a periphery and a non-connected position.

During power generation, fuel gas is supplied to the anode 11. The supply of air to the cathode 14 draws air from the side surface of the cell stack structure (for example, the front of the face of the page in FIG. 3).

Although this is not shown, the fuel cell 10 further includes a member such as a lead that sends a current generated by the cell stack to an external apparatus, and a gas reforming unit that includes a catalyst or the like for reforming the fuel gas.

4. Method of Manufacturing Fuel Cell 4-1 Formation of Anode

The anode 11 can be formed by powder compaction. That is to say the anode 11 may include the feature of introducing powder, in which material for the anode 11 is mixed, into a mold, and compressing to thereby mold a compacted powder body.

The material for the anode 11 may be configured according to the description above in relation to the configuration of the fuel cell. The material includes use of nickel oxide, zirconia and a pore forming agent as required. A pore forming agent is an additive that forms pores in the anode. The pore forming agent includes use of a material that is removed in later processing steps. Examples of such materials include cellulose powder.

This is no particular limitation on the mixing ratio of the material, and the mixing ratio may be suitably set in response to the characteristics or the like required by the fuel cell.

The pressure applied to the powder during powder compaction molding is set to impart sufficient rigidity to the anode.

The internal structure of the anode 11 such as the gas conduit (not shown) is formed by powder compaction molding in a configuration in which a member that is removed by firing (a cellulose sheet or the like) is disposed in an inner portion of the powder body and then firing is performed.

4-2 Formation of Electrolyte Layer

The method of manufacturing the fuel cell includes formation of the electrolyte layer on a molded body of the anode formed by powder compaction.

The method of formation of the electrolyte is a method such as CIP (cold isostatic pressing) that uses an electrolyte material that is processed into a sheet configuration, or thermo-compression bonding. Otherwise, a slurry dip method may be used in which the anode is immersed into an electrolyte material adjusted to a slurry configuration. When using the CIP method, the pressure during the pressing operation on the sheet is preferably 50 to 300 MPa.

4-3 Firing

The method of manufacturing the fuel cell includes co-firing (co-sintering) of the electrolyte layer and the anode formed by powder compaction. The temperature and the time for firing are set in response to the cell material.

4-4 Degreasing

Degreasing may be performed prior to firing in 4-3. The degreasing is executed by heating. The conditions such as temperature and time are set in response to the material of the cell or the like.

4-5 Formation of Cathode

The cathode is formed by firing after formation of a layer of material for the cathode by a printing method, powder compaction or the like on a stacked body of the barrier layer, the electrolyte layer and the anode. More specifically, in case of an electrode material configured from LSCF, when using a printing method, a paste prepared by mixing LSCF together with a binder, dispersal agent and dispersal medium is printed onto the stacked body and fired (firing temperature 900 degrees C. to 1100 degrees C., and firing time 1 hr to 10 hrs).

4-6 Other Processing Steps

Other steps may be included in the manufacturing method depending on the configuration of the fuel cell. For example, the manufacturing method may include a step of providing a reaction prevention layer between the electrolyte layer and the cathode, or may include a step of forming a double layered structure in the anode (a step of forming the base plate and a step of forming the anode active layer).

5. Segmented-in-Series Fuel Cell

The fuel cell 10 described above includes a plurality of stacked cells 1 and a current collecting member 4 connecting the cells 1 electrically. In other words, the fuel cell 10 is a vertically-striped fuel cell. However, the technique disclosed herein may also be applied to a segmented-in-series fuel cell. A segmented-in-series fuel cell will be described below.

Figure 6:
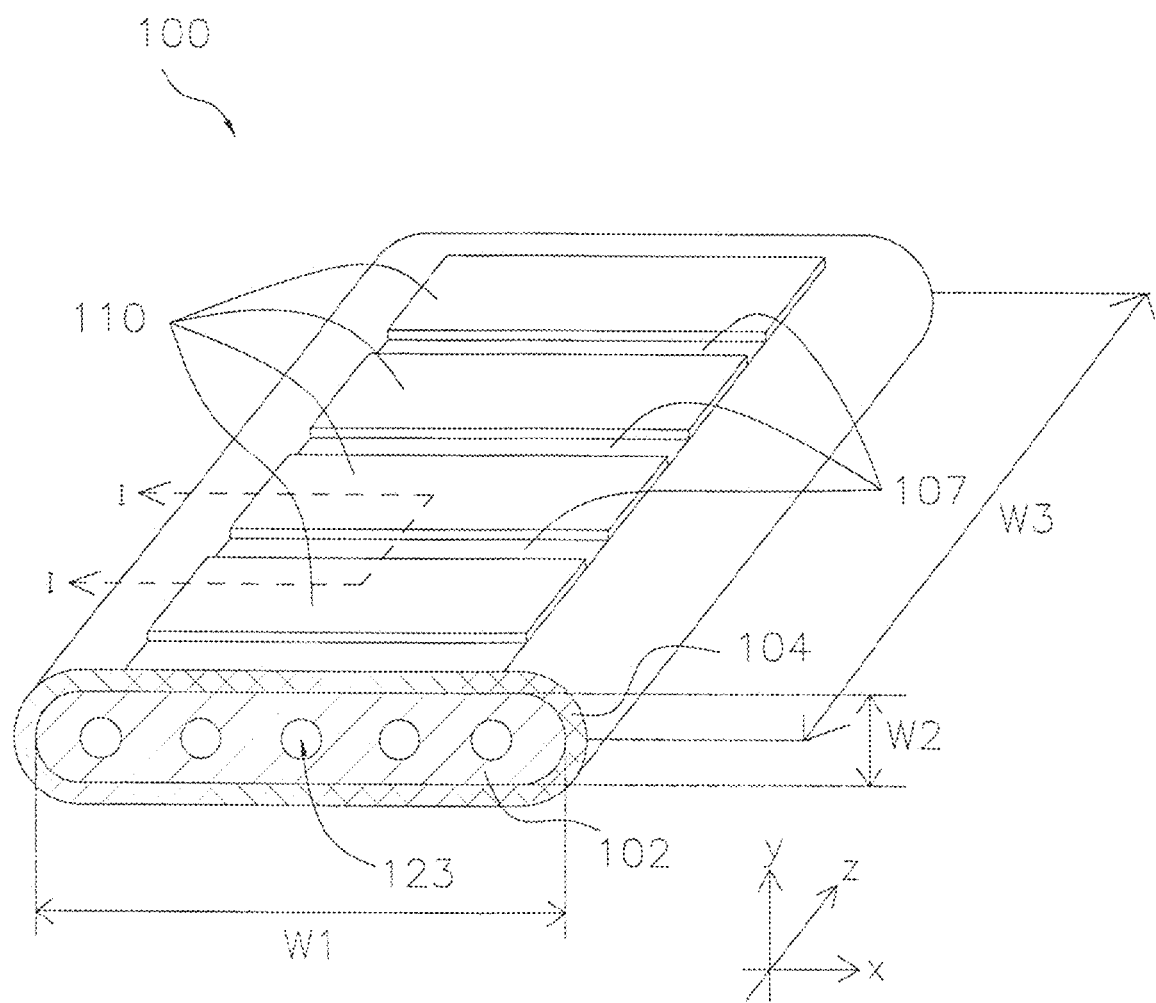
FIG. 6 is a perspective view illustrating the external appearance of a segmented-in-series fuel cell.

The segmented-in-series fuel cell (hereinafter simply referred to as a "fuel cell") 100 includes a support base plate 102, an anode 103, an electrolyte layer 104, a cathode 106, an interconnector 107, a current collecting unit 108, and a barrier layer 13. The fuel cell 100 includes a plurality of cells 110. Those component elements that are the same as the component elements already described above are denoted by the same reference numerals, and such description will not be repeated. In FIG. 6, for sake of convenience of description, the current collecting unit 108 is not illustrated.

The fuel cell 100 includes the cells 110 disposed on the support base plate 102 and an interconnector 107 that electrically connects the cells 110. The cells 110 are units that include an anode 103 and a cathode 106 that corresponds to the anode 103. More specifically, the cells 110 include an anode 103, an electrolyte layer 104 and a cathode 106 stacked in the thickness direction (y axis direction) of the support base plate 102. The anode 103, the electrolyte layer 104 and the cathode 106 configure the power generation element of the cell 110.

The support base plate 102 is flat and elongated in one direction (z axis direction). The support base plate 102 is a porous body that has electrical insulating properties. The support base plate 102 may include nickel. More specifically, the support base plate 102 may contain $Ni$—$Y_2O_3$ (nickel yttria) as a main component. The nickel may be included as an oxide (NiO). During power generation, NiO may be reduced to Ni by hydrogen gas.

Figure 7:
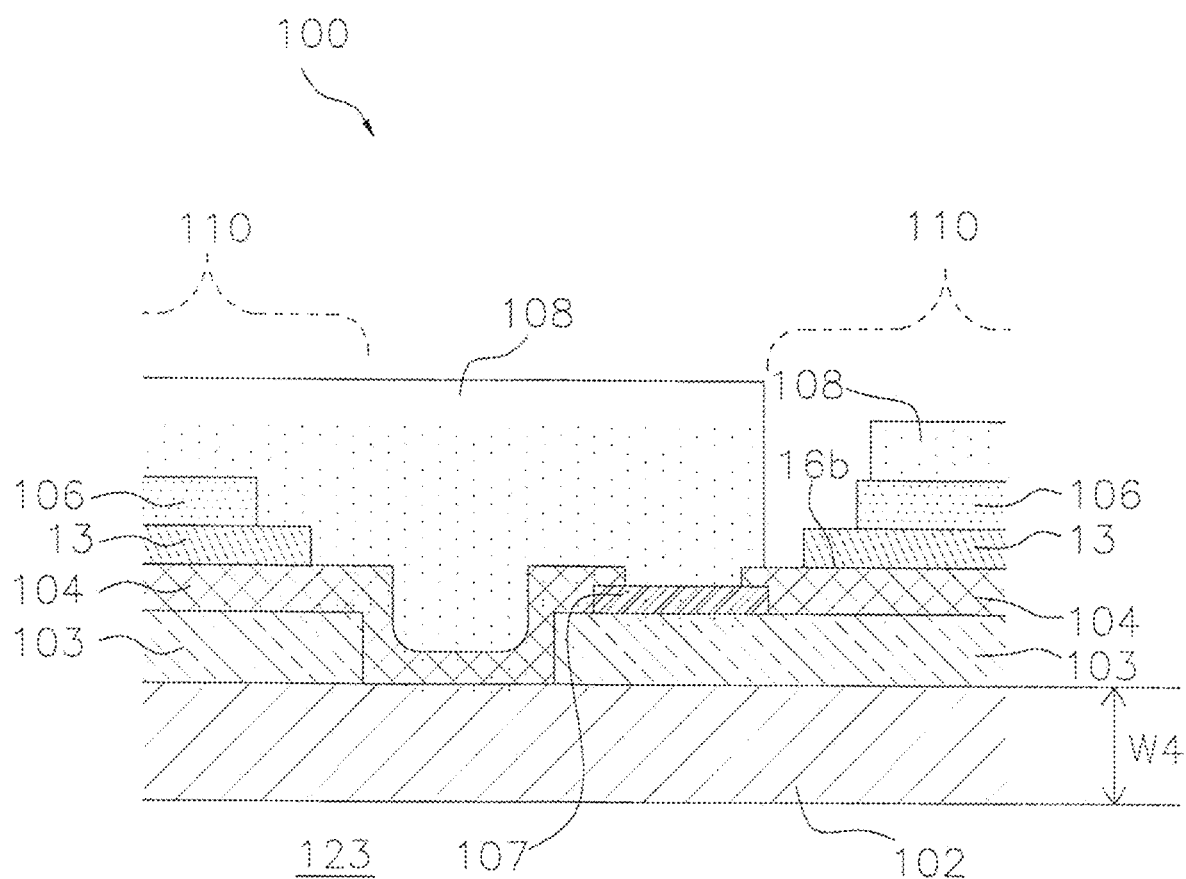
FIG. 7 is a sectional view along the direction I-I of the arrow in FIG. 6.

As illustrated in FIG. 6 and FIG. 7, a conduit 123 is provided in an inner portion of the support base plate 102. The conduit 123 extends along the longitudinal direction (z axis direction) of the support base plate 102. During power generation, fuel gas flows into the conduit 123, through a hole that is provided in the support base plate 102 to thereby supply fuel gas to the anode 103 described below.

The anode 103 is provided on the support base plate 102. A plurality of anodes 103 is disposed on a single support base plate 102 and is arranged in the longitudinal direction (z axial direction) of the support base plate 102. That is to say, a space is provided between adjacent anodes 103 with respect to the longitudinal direction (x axis direction) of the support base plate 102.

The composition of the anode 103 may be the same as the composition of the anode 11.

The anode 103 may include an anode current collecting layer and an anode active layer. The anode current collecting layer is provided on the support base plate 102, and the anode active layer is provided on the anode current collecting layer while avoiding superimposition with respect to the interconnector 107.

The anode 103 may include an anode current collecting layer and an anode active layer. The anode current collecting layer is provided on the support base plate 102 and the anode active layer is provided on the anode current collecting layer. The composition of the anode current collecting layer and the anode active layer has been described above.

The electrolyte layer 104 is also termed a solid electrolyte layer. As illustrated in FIG. 7, the electrolyte layer 104 is provided on the anode 103. In a region that is not provided with the anode 103 on the support base plate 102, the electrolyte layer 104 may be provided on the support base plate 102.

The electrolyte layer 104 includes a non-connected position in the longitudinal direction (z axis direction) of the support base plate 102. In other words, a plurality of electrolyte layers 104 is disposed at an interval in the z axis direction. Namely, a plurality of electrolyte layers 104 is provided along the longitudinal direction (z axis direction) of a single support base plate 102.

Electrolyte layers 104 adjacent in the z axis direction are connected by an interconnector 107. In other words, the electrolyte layers 104 are connected from an interconnector 107 to an interconnector 107 that is adjacent to that interconnector 107 in the longitudinal direction (z axis direction) of the support base plate 102. The interconnector 107 and the electrolyte layer 104 have a dense structure in comparison to the support base plate 102 and the anode 103. Therefore, the interconnector 107 and the electrolyte layer 104 function as a sealing portion that partitions air and fuel gas by the provision of a connected structure in the z axis direction in the fuel cell 100.

The composition of the electrolyte layer 104 may include a composition that is the same as the electrolyte layer 15 as described above.

The same description provided in relation to the vertical-striped fuel cell applies to the configuration of the barrier layer 13. The barrier layer 13 is provided between the cathode 106 and the electrolyte layer 104.

The cathode 106 is disposed on the barrier layer 13 without projecting from the outer edge of the barrier layer 13. One cathode 106 is stacked on one anode 103. That is to say, a plurality of cathodes 106 is provided along the longitudinal direction (z axis direction) of the support base plate 102 on a single support base plate 102.

The cathode 106 is configured by a complex oxide having a perovskite structure expressed by the general formula $ABO_3$ in the same manner as the cathode 14 described above. The cathode 106 may include the complex oxide as a "principal component", and may include components other than the complex oxide. The material used to configure the cathode 106 is preferable the electrode described in "Section 1.".

As used herein the composition distribution of the cathode 106 is preferably exhibits a highly uniform configuration. More specifically, in an arbitrary field on a sectional surface of the cathode 106, the respective atomic percentages of each element contained at the A site is acquired using EDS at 10 spots, and when the standard deviation of the atomic percentage is calculated. It is preferred that the standard deviation value of the A site is no more than 10.4. The position of the 10 spots and the analysis spot size in an arbitrary field is as described in "Section 1.".

The cathode 106 preferably includes an additive (P, Cr, and B) at a predetermined weight ratio relative to the total weight of the electrode material in the same manner as the cathode 15 of the vertically-striped fuel cell described above. In this configuration, the content amount of P is preferably at least 1 ppm to no more than 50 ppm in a weight ratio relative to the starting materials, and more preferably at least 1 ppm and no more than 30 ppm. The content amount of Cr is preferably at least 1 ppm to no more than 500 ppm in a weight ratio relative to the starting materials, and more preferably at least 1 ppm and no more than 100 ppm. The content amount of B is preferably at least 1 ppm to no more than 50 ppm in a weight ratio relative to the starting materials, and more preferably at least 1 ppm and no more than 10 ppm.

As described above, the interconnector 107 may be disposed to configure electrical contact between the cells 110. In FIG. 7, the interconnector 107 is stacked onto the anode 103.

In the present specification, "stack" includes, the disposition of two elements in connection, and a disposition, that provides an overlap in the y axis direction although there is not a connection.

In FIG. 7, as described above, the interconnector 107 is disposed to span the interval between the electrolyte layers 104 in the longitudinal direction (z axis direction) of the support base plate 102. In this manner, cells 110 that are adjacent in the longitudinal direction (z axis direction) of the support base plate 102 are electrically connected.

The interconnector 107 configures an electrode that is used for the electrical connection between the plurality of cells 110. More specifically the interconnector 107 illustrated in FIG. 7 functions as an electrode for the cells 110 disposed on the right side of FIG. 7.

The interconnector 107 that configures the electrode as described above, in the same manner as the cathode 106 described above, includes a main component of a perovskite complex oxide as a main component. In particular, a chromite-based material such as lanthanum chromite ($LaCrO_3$) is an example of a perovskite complex oxide used in the interconnector 107.

The composition formula for the lanthanum chromite is expressed by general formula (1) below.

$$Ln_{1-x}A_xCr_{1-y-z}B_yO_3 \qquad (1)$$

In Formula (1), wherein Ln is at least one type of element selected from the group of Y and a lanthanoid, A is at least one type of element selected from the group of Ca, Sr and Ba, and B is at least one type of element selected from the group of Ti, V, Mn, Fe, Co, Cu, Ni, Zn, Mg and Al, and wherein $0.025 \leq x \leq 0.3$, $0 \leq y \leq 0.22$, $0 \leq z \leq 0.15$.

Lanthanum chromite is a material that can stably exist under both an atmospheric and reducing atmosphere at the operating temperature (600 to 1000 degrees C.) of the SOFC, and is preferably used as an interconnector material (electrode material) of an SOFC cell that includes horizontal stripes.

However, it is known that lanthanum chromite is a sintering resistant material, and addition is required of an additive that facilitates firing, such as a sintering agent (CaO, SrO, or the like), to co-sinter with the support base plate 102, the anode 103 and the electrolyte layer 104 for application to the SOFC cell.

The current collecting unit 108 is disposed to electrically connect the interconnector 107 and the cell 110. More specifically, the current collecting unit 108 is provides a connection from the cathode 106 to the interconnector 107 that is included in the cell 110 that is adjacent to the cell 110 that includes the cathode 106. The current collecting unit 108 may include conductive properties.

The cathode 106 that is included in the cell 110 is electrically connected to the anode 103 of the adjacent cell 110 through the current collecting unit 108 and the interconnector 107. That is to say, the current collecting unit 108 participates in the connection between cells 110 in addition to the interconnector 107.

The specific dimensions of each component of the fuel cell 100 may be set as shown below.

Width W1 of support base plate 102: 1 to 10 cm
Thickness W2 of support base plate 102: 1 to 10 mm
Length W3 of support base plate 102: 5 to 50 cm
Distance W4 from outer surface of support base plate 102 (interface between support base plate 102 and anode) to conduit 123: 0.1-4 mm
Thickness of Anode 103: 50-500 micrometers (When the anode 103 includes an anode current collecting layer and an anode active layer; thickness of anode current collecting layer: 50-500 micrometers, thickness of anode active layer: 5-30 micrometers)
Thickness of electrolyte layer 104: 3-50 micrometers
Thickness of cathode 106: 10-100 micrometers
Thickness of interconnector 107: 10-100 micrometers
Thickness of current collecting unit 108: 50-500 micrometers The dimensions described in relation to a vertically-striped fuel cell may be adopted for the constituent elements that are not specifically disclosed. However it goes without saying that the technique herein disclosed is not limited to these values.

(Additional Note)

The solid oxide fuel cell includes a cathode, an anode and a solid electrolyte disposed between the cathode and the anode, the cathode including a complex oxide material that has a perovskite structure expressed by the general formula $ABO_3$. The complex oxide is preferably such that P is at least 1 ppm and no more than 50 ppm, Cr is at least 1 ppm and no more than 500 ppm, and B is at least 1 ppm and no more than 50 ppm in a weight ratio relative to the total weight of the complex oxide.

The content amount of P included in the cathode is more preferably no more than 30 ppm in a weight ratio relative to the total weight of the cathode.

The content amount of Cr included in the cathode is more preferably no more than 100 ppm in a weight ratio relative to the total weight of the cathode.

The content amount of B included in the cathode is more preferably no more than 10 ppm in a weight ratio relative to the total weight of the cathode.

EXAMPLES

A. Preparation of Cell

A NiO-8YSZ anode active layer (10 micrometers), an 8YSZ electrolyte layer (3 micrometers) and a GDC barrier layer (3 micrometers) are stacked on an NiO-8YSZ anode baseplate (500 micrometers), and fired under conditions of 1400 degrees C. for 2 hours.

As illustrated in Table 1 to Table 3, 10 types of electrode materials (No. 1 to No. 10) including $(La_{0.6}Sr_{0.4})(Co_{0.2}Fe_{0.8})O_3$, 6 types of electrode materials (No. 11 to No. 16) including $(La_{0.8}Sr_{0.2})FeO_3$ as shown in Table 7 to Table 9, and 6 types of electrode materials (No. 17 to No. 22) including $(Ni_{0.6}Fe_{0.4})O_3$ as shown in Table 13 to Table 15 were obtained. Then as illustrated in Table 19, 6 types of electrode materials (No. 23 to No. 28) including $(La_{0.6}Sr_{0.4})(Co_{0.2}Fe_{0.8})O_3$ in the same manner as No. 1 to No. 10 were obtained. However, no additives were actively added to No. 28. ICP analysis is used to confirm that the added amount of the additive (at least one of P, Cr and B) during electrode operation corresponds to the content amount of the additive in the electrode material after calcination (synthesis).

Those electrode materials that are expressed using the same general formula but denoted by different reference numerals differ in relation to starting materials, firing conditions, or comminution conditions. Furthermore, the tables indicate whether each electrode material was synthesized using a solid phase method or a liquid phase method. Furthermore, the content amount of the additive (P, Cr or B) included in the electrode material is disclosed in the table.

The average particle diameter of the resulting disintegrated product is 200 micrometers. The disintegrated product was used in the measurement of the composition distribution described below.

The disintegrated product was subjected to comminution using a ball mill apparatus. The average particle diameter of the electrode material (powder) was all no more than 1.0 micrometer upon measurement using a laser diffraction/scattering type particle size distribution measurement apparatus (LA-700 manufactured by Horiba Ltd.).

A paste was prepared using the resulting powder and the paste was used to form a film with a screen printing method resulting in a cathode (30 micrometers) on the barrier layer. The cathode was attached by firing onto the barrier layer by heating to no more than 1000 degrees C. for 2 hours.

SOFCs were obtained in the above manner.

B. Evaluation

B-1 Measurement of Composition Distribution of Electrode Material

The atomic percentage distribution of each element in the disintegrated product formed of electrode material according to No. 1 to No. 22 was measured using EPMA. More specifically, measurements are performing using an electron probe micro analyzer manufactured by JEOL Ltd. (model: JXA-8500F). Next, in an arbitrary field, EDS is used to measure the atomic percentage (mol %) of an oxide of each element at the A site and each element at the B site in relation to 10 spots in a section not forming a cavity that can be identified in an SEM image. More specifically, measurements were performed using a field emission scanning electron microscope (model: ULTRA55) manufactured by Zeiss AG (Germany).

Then, the respective concentration of La and Sr at the A site was measured at 10 spots in relation to each of the samples No. 1 to No. 10 to obtain an average value for the La concentration and the standard deviation of the La concentration at each spot and the average value for the Sr concentration and the standard deviation of the Sr concentration at each spot. In the same manner a concentration average value and a standard deviation for the concentration at each spot were obtained for Co and Fe at the B site. Furthermore, the maximum value of the standard deviation in relation to the atomic percentage of elements at the A site and the maximum value of the standard deviation in relation to the atomic percentage of elements at the B site were obtained for each sample No. 1 to No. 10.

The same operation was performed in relation to the concentration of Fe at the B site and La and Sr at the A site for each sample No. 11 to No. 16, and the same operation was performed in relation to the concentration of Fe and Ni at the B site and La at the A site for each sample No. 17 to No. 22.

B-2 Measurement of Composition Distribution of Cathode

The atomic percentage distribution of each element was measured using an EPMA (JEOL Ltd. model: JXA-8500F) on a sectional surface of the cathode formed from the cathode material according to No. 1 to No. 22. Next, the atomic percentage (mol %) as an oxide of each element in the A site and the B site in 10 spots in the SEM image in an arbitrary field was measured using EDS (model: ULTRA55, manufactured by Zeiss AG (Germany) on a sectional surface of the cathode.

More specifically, the respective concentration of La and Sr at the A site on a sectional surface of the cathode formed from the cathode material according, to No. 1 to No. 1.0 was measured at 10 spots to thereby obtain a standard deviation of the concentration at each spot and the average value of the Sr concentration in addition to the standard deviation of the concentration at each spot and the average value of the La concentration. Furthermore, the standard deviation of the concentration at each spot and the concentration average value was obtained in the same manner in relation to Co and Fe at the B site. The maximum value of the standard deviation at the atomic percentage of each element at the A site and maximum value of the standard deviation of the atomic percentage of each element, at the B site were obtained in relation to each sample according to No. 1 to No. 10.

The same operation was performed in relation to the concentration of Fe at the B site and La and Sr at the A site on the sectional surface of the cathode according to No. 11 and No. 16, and the same operation was performed in relation to the concentration of Fe and Ni at the B site and La at the A site on the sectional surface of the cathode according to No. 17 and No. 22.

B-3 Durability Experiments

Continuous power generation was performed using the prepared SOFC cell. The voltage drop rate (deterioration rate) was calculated per 1000 hours using power generation conditions of 750 degrees C. and current density: 0.3 A/cm$^2$. A deterioration rate of no more than 1% was evaluated as "good".

C Results

C-1 No. 1 to No. 10: $(La_{0.6}Sr_{0.4})(Co_{0.2}Fe_{0.8})O_3$

In relation to the samples No. 1 to No. 10, the measurement results for the concentration of No. 1 sample as an example and the results of the calculation of the average value and the standard deviation are shown in Table 1. Table 2 shows the maximum value of the standard deviation for the atomic percentage of each element in relation to samples No. 1 to No. 10. The maximum value of the standard deviation at the A site and the maximum value of the standard deviation at the B site are underlined in relation to each sample. Table 3 shows the maximum value of the standard deviation at the A site and the maximum value of the standard deviation at the B site shown in Table 2, the voltage drop rate (deterioration rate) per 1000 hours, and the evaluation result based on the voltage drop rate for samples No. 1 to No. 10.

Figure 4:
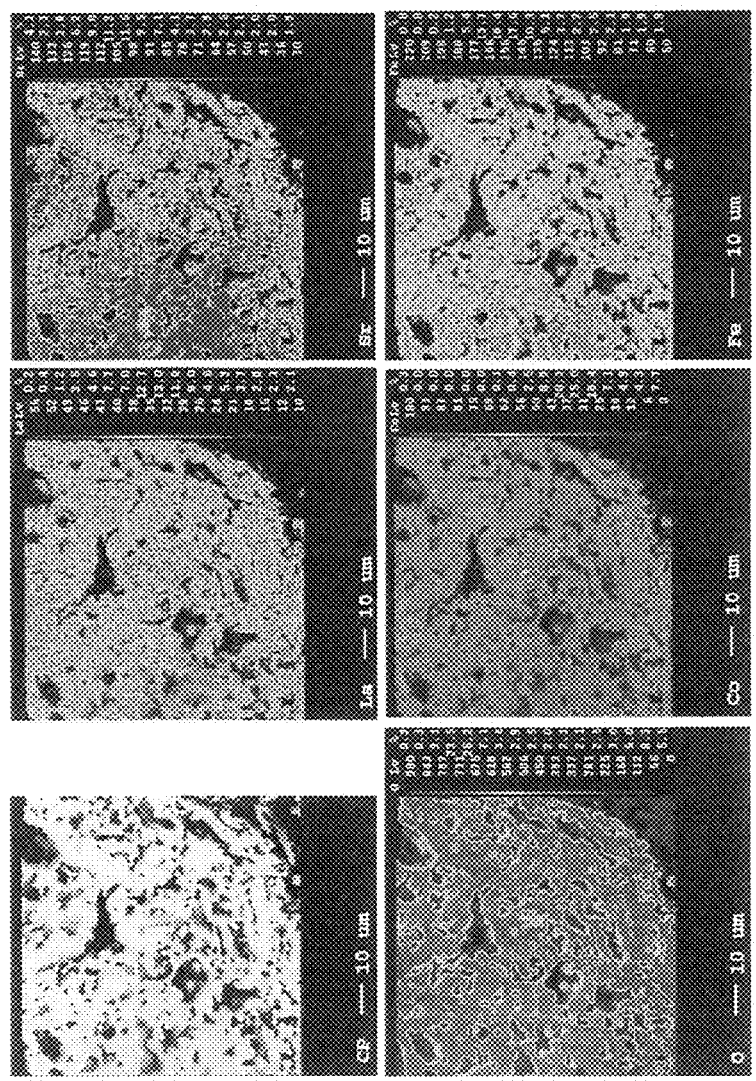
FIG. 4 is a SEM image of a single field and an image of concentration mapping in relation to a sample No. 1 according to the example.
Figure 5:
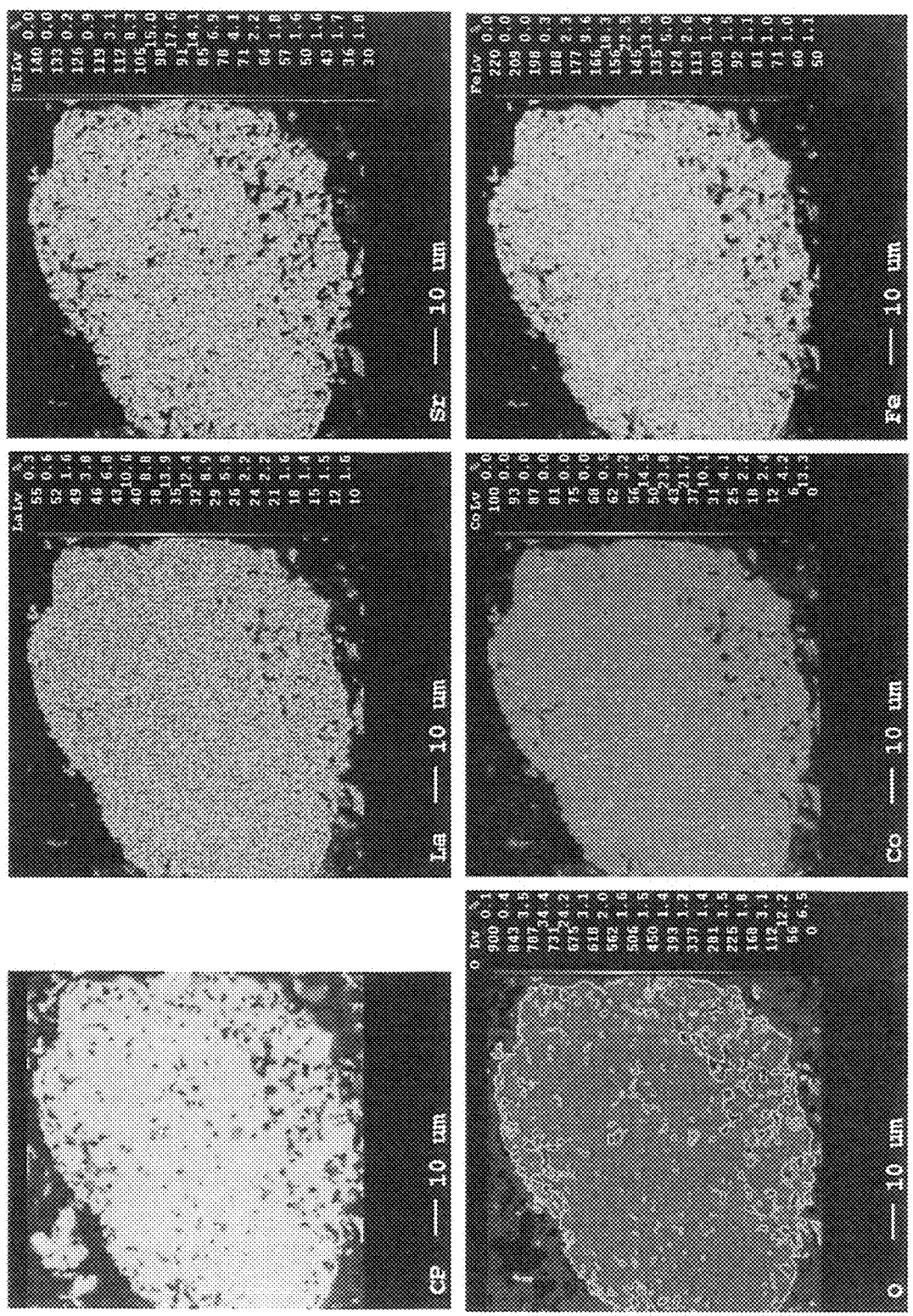
FIG. 5 is a SEM image of a single field and an image of concentration mapping in relation to a sample No. 7 according to the examples.

FIG. 4 and FIG. 5 show respective SEM images and concentration mapping images for the same field in relation to samples No. 1 and No. 7. In FIG. 4 and FIG. 5, the actual positions of high atomic percentage are shown by a red color and positions of low atomic percentage are shown with a blue color.

Furthermore, Table 4 shows the measurement results for the concentration and the results of the calculation of the average value and the standard deviation on the sectional surface of the cathode according to sample No. 1 of samples No. 1 to No. 10. Table 5 shows the maximum value of the standard deviation of the atomic percentage of each element in the cathode according to No. 1 to No. 10. In Table 5, an underline is applied to the maximum value of the standard deviation at the B site and the maximum value of the standard deviation at the A site. Table 6 shows the evaluation results based on the voltage drop rate (deterioration rate) per 1000 hours, and the maximum value of the standard deviation at the B site and the maximum value of the standard deviation at the A site shown in Table 5 in relation to the cathode according to No. 1 to No. 10.

| Concentration Analysis Results for 10 Spots in Sample No. 1 of $(La_{0.6}Sr_{0.4})(Co_{0.2}Fe_{0.8})O_3$ | | | | |
|---|---|---|---|---|
| Analysis Spot | La (mol %) | Sr (mol %) | Co (mol %) | Fe (mol %) |
| 1 | 17.1 | 30.9 | 6.9 | 45.1 |
| 2 | 19.4 | 28.7 | 6.5 | 45.4 |
| 3 | 24.4 | 22.3 | 7.9 | 45.4 |
| 4 | 24.1 | 22.5 | 8.6 | 44.8 |
| 5 | 22.1 | 28.8 | 7.7 | 42.1 |
| 6 | 29.7 | 20.1 | 9.1 | 41.1 |
| 7 | 32.5 | 22.5 | 10.3 | 34.7 |
| 8 | 38.3 | 16.8 | 9.5 | 35.4 |
| 9 | 25.6 | 20.3 | 10.4 | 43.7 |
| 10 | 19.5 | 26.8 | 7.3 | 46.4 |
| Average Value | 25.27 | 23.97 | 8.35 | 42.41 |
| Standard Deviation | 6.23 | 4.34 | 1.36 | 3.99 |

TABLE 2

Maximum Value for Standard Deviation and Additive Content Amount for Samples No. 1 to No. 10 of $(La_{0.6}Sr_{0.4})(Co_{0.2}Fe_{0.8})O_3$

| Sample No. | Synthesis Method | Standard Deviation | | | | Additive content amount (ppm) | | |
|---|---|---|---|---|---|---|---|---|
| | | A site | | B site | | | | |
| | | La | Sr | Co | Fe | P | Cr | B |
| 1 | Solid phase method | 6.23 | 4.34 | 1.36 | 3.99 | 40 | 400 | 30 |
| 2 | Solid phase method | 3.12 | 4.11 | 0.82 | 1.54 | 35 | 300 | 20 |

TABLE 2-continued

Maximum Value for Standard Deviation and Additive Content Amount for Samples No. 1 to No. 10 of $(La_{0.6}Sr_{0.4})(Co_{0.2}Fe_{0.8})O_3$

| Sample No. | Synthesis Method | Standard Deviation | | | | Additive content amount (ppm) | | |
|---|---|---|---|---|---|---|---|---|
| | | A site | | B site | | | | |
| | | La | Sr | Co | Fe | P | Cr | B |
| 3 | Solid phase method | 10.3 | 8.32 | 2.87 | 3.61 | 50 | 500 | 50 |
| 4 | Solid phase method | 1.56 | 0.89 | 0.68 | 0.56 | 40 | 250 | 20 |
| 5 | Solid phase method | 7.52 | 13.2 | 4.98 | 2.86 | 70 | 800 | 80 |
| 6 | Solid phase method | 11.5 | 6.32 | 3.15 | 4.88 | 60 | 630 | 60 |
| 7 | Liquid phase method | 0.05 | 0.04 | 0.1 | 0.05 | 20 | 20 | 3 |
| 8 | Liquid phase method | 0.27 | 0.46 | 0 | 0.07 | 30 | 100 | 5 |
| 9 | Liquid phase method | 1.13 | 1.03 | 0.68 | 0.36 | 45 | 460 | 50 |
| 10 | Liquid phase method | 0.2 | 0.25 | 0.03 | 0.05 | 20 | 60 | 10 |

TABLE 3

Evaluation Result for Deterioration Rate and Maximum Value of Standard Deviation in Samples No. 1 to No. 10 of $(La_{0.6}Sr_{0.4})(Co_{0.2}Fe_{0.8})O_3$

| Sample No. | Maximum Value Standard Deviation at A site | Maximum Value Standard Deviation at B site | Deterioration Rate (%/1000 hr) | Evaluation Result |
|---|---|---|---|---|
| 1 | 6.23 | 3.99 | 0.76 | Good |
| 2 | 4.11 | 1.54 | 0.63 | Good |
| 3 | 10.3 | 3.61 | 0.95 | Good |
| 4 | 1.56 | 0.68 | 0.65 | Good |
| 5 | 13.2 | 4.98 | 1.85 | Poor |
| 6 | 11.5 | 4.88 | 1.52 | Poor |
| 7 | 0.05 | 0.10 | 0.30 | Good |
| 8 | 0.46 | 0.07 | 0.52 | Good |
| 9 | 1.13 | 0.68 | 0.87 | Good |
| 10 | 0.25 | 0.05 | 0.45 | Good |

TABLE 4

Concentration Analysis Result for 10 Spots on Cathode configured from Sample No. 1 of $(La_{0.6}Sr_{0.4})(Co_{0.2}Fe_{0.8})O_3$

| Analysis Spot | La(mol %) | Sr(mol %) | Co(mol %) | Fe(mol %) |
|---|---|---|---|---|
| 1 | 18.5 | 15.3 | 7.3 | 48.3 |
| 2 | 23.5 | 22.3 | 10.5 | 36.3 |
| 3 | 31.2 | 21.6 | 7.1 | 42.3 |
| 4 | 23.5 | 25.3 | 9.3 | 37.5 |
| 5 | 36.3 | 16.2 | 8.8 | 44.4 |
| 6 | 37.5 | 23.2 | 10.5 | 33.8 |
| 7 | 24.5 | 25.3 | 6.3 | 39.6 |
| 8 | 26.5 | 23.4 | 12.3 | 41.6 |
| 9 | 21.1 | 18.8 | 8.6 | 46.3 |
| 10 | 23.6 | 20.3 | 9.1 | 43.2 |
| Average Value | 26.62 | 21.17 | 8.98 | 41.33 |
| Standard Deviation | 6.02 | 3.31 | 1.72 | 4.32 |

TABLE 5

Additive Content Amount and Maximum Value of Standard Deviation for Cathode configured from Sample No. 1 to No. 10 of $(La_{0.6}Sr_{0.4})(Co_{0.2}Fe_{0.8})O_3$

| Sample No. | Standard Deviation | | | | Additive Content Amount (ppm) | | |
|---|---|---|---|---|---|---|---|
| | A Site | | B Site | | | | |
| | La | Sr | Co | Fe | P | Cr | B |
| 1 | 6.02 | 3.31 | 1.72 | 4.32 | 40 | 400 | 30 |
| 2 | 2.98 | 4.08 | 1.21 | 1.68 | 35 | 300 | 20 |
| 3 | 10.4 | 9.12 | 2.68 | 3.78 | 50 | 500 | 50 |
| 4 | 1.36 | 0.92 | 0.55 | 0.45 | 40 | 250 | 20 |
| 5 | 7.88 | 14.1 | 5.21 | 3.12 | 70 | 800 | 80 |
| 6 | 11.3 | 6.45 | 3.01 | 4.85 | 60 | 630 | 60 |
| 7 | 0.03 | 0.03 | 0.12 | 0.08 | 20 | 20 | 3 |
| 8 | 0.32 | 0.48 | 0.06 | 0.08 | 30 | 100 | 5 |
| 9 | 1.25 | 0.98 | 0.72 | 0.45 | 45 | 460 | 50 |
| 10 | 0.25 | 0.33 | 0.05 | 0.09 | 20 | 60 | 10 |

TABLE 6

Evaluation Result of Deterioration Rate and Maximum Value of Standard Deviation for Cathode configured from Sample No. 1 to No. 10 of $(La_{0.6}Sr_{0.4})(Co_{0.2}Fe_{0.8})O_3$

| Sample No. | Maximum Value Standard Deviation at A site | Maximum Value Standard Deviation at B site | Deterioration Rate (%/1000 hr) | Evaluation Result |
|---|---|---|---|---|
| 1 | 6.02 | 4.32 | 0.76 | Good |
| 2 | 4.08 | 1.68 | 0.63 | Good |
| 3 | 10.4 | 3.78 | 0.95 | Good |
| 4 | 1.36 | 0.55 | 0.65 | Good |
| 5 | 14.1 | 5.21 | 1.85 | Poor |
| 6 | 11.3 | 4.85 | 1.52 | Poor |
| 7 | 0.03 | 0.12 | 0.3 | Good |
| 8 | 0.48 | 0.08 | 0.52 | Good |
| 9 | 1.25 | 0.72 | 0.87 | Good |
| 10 | 0.33 | 0.09 | 0.45 | Good |

As illustrated in FIG. 4 to FIG. 5 and Table 1 to Table 3, the deterioration rate was suppressed to a small value for samples No. 1 to No. 4, and No. 7 to No. 10. These samples exhibit a standard deviation (scattering) for the atomic percentage of elements at the A site of less than 11.5, more specifically, the value was no more than 10.3. The standard deviation for the atomic percentage of elements at the B site was no more than 3.99.

As shown by Table 4 to Table 6, the deterioration rate is reduced by a large extent at the cathode configured from samples No. 1 to No. 4 and No. 7 to No. 10. In these cathodes, the standard deviation of the atomic percentage of each element at the A site is less than 11.3, and more specifically, is less than or equal to 10.4. The standard deviation of the atomic percentage of each element at the B site is less than or equal to 4.32.

In samples No. 5 and No. 6 which exhibited a large deterioration rate, the standard deviation for the atomic percentage of elements at the A site was at least 11.5, and the standard deviation for the atomic percentage of elements at the B site was at least 4.88.

In cathodes configured by samples No. 5 to No. 6 in which the deterioration rate was increased, the standard deviation of the atomic percentage of each element at the A site is at least 11.3. The standard deviation of the atomic percentage of each element at the B site is at least 4.85.

C-2 No. 11 to No. 16: $(La_{0.8}Sr_{0.2})FeO_3$

In relation to the samples No. 11 to No. 16, the measurement results using the concentration of No. 11 sample as an example, and the results of the calculation of the average value and the standard deviation, are shown in Table 7. Table 8 shows the maximum value of the standard deviation for the atomic percentage of each, element in relation to samples No. 11 to No. 16. The maximum value of the standard deviation at the A site and the maximum value of the standard deviation at the B site are underlined in relation to each sample. Table 9 shows the maximum value of the standard deviation at the A site and the maximum value of the standard deviation at the B site shown in Table 8, the voltage drop rate (deterioration rate) per 1000 hours, and the evaluation results based on the voltage drop rate for samples No. 11 to No. 16.

Table 10 shows the measurement results for the concentration and the calculation results for the average value and standard deviation at the sectional surface of the cathode according to sample No. 11 of the samples No. 11 to No. 16. Table 11 shows the maximum value of the standard deviation value of the atomic percentage of each element for the cathode according to No. 11 to No. 16. In Table 11, an underline is applied to the maximum value for the standard deviation value at the A site and the maximum value for the standard deviation value at the B site. Table 12 shows the maximum value of the standard deviation at the A site and the maximum value of the standard deviation at the B site shown in Table 11, the voltage drop rate (deterioration rate) per 1000 hours, and the evaluation results based on the voltage drop rate for the cathode according to samples No. 11 to No. 16.

TABLE 7

Concentration Analysis Results for 10 Spots in Sample No. 11 of $(La_{0.8}Sr_{0.2})FeO_3$

| Analysis Spot | La (mol %) | Sr (mol %) | Fe (mol %) |
| --- | --- | --- | --- |
| 1 | 36.4 | 8.8 | 54.8 |
| 2 | 35.9 | 9.1 | 55.0 |
| 3 | 30.5 | 11.4 | 58.1 |
| 4 | 36.1 | 8.8 | 55.1 |
| 5 | 41.8 | 6.5 | 51.7 |
| 6 | 36.9 | 8.5 | 54.6 |
| 7 | 49.7 | 6.1 | 44.2 |
| 8 | 28.2 | 11.1 | 60.7 |
| 9 | 36.8 | 8.7 | 54.5 |
| 10 | 42.0 | 6.6 | 51.4 |
| Average Value | 37.43 | 8.56 | 54.01 |
| Standard Deviation | 5.74 | 1.71 | 4.16 |

TABLE 8

Maximum Value for Standard Deviation and Additive Content Amount for Samples No. 11 to No. 16 of $(La_{0.8}Sr_{0.2})FeO_3$

| Sample No. | Synthesis Method | Standard Deviation | | | Additive content amount (ppm) | | |
| --- | --- | --- | --- | --- | --- | --- | --- |
| | | A site | B site | | | | |
| | | La | Sr | Fe | P | Cr | B |
| 11 | Solid phase method | 5.74 | 1.71 | 4.16 | 20 | 100 | 10 |
| 12 | Solid phase method | 4.28 | 2.95 | 3.25 | 30 | 300 | 20 |
| 13 | Solid phase method | 7.91 | 2.77 | 3.68 | 50 | 500 | 50 |
| 14 | Solid phase method | 10.95 | 2.65 | 4.98 | 60 | 550 | 70 |
| 15 | Liquid phase method | 1.04 | 1.73 | 0.65 | 20 | 80 | 10 |
| 16 | Liquid phase method | 0.43 | 0.09 | 0.21 | 10 | 30 | 5 |

TABLE 9

Evaluation Result for Deterioration Rate and Maximum Value of Standard Deviation in Samples No. 11 to No. 16 of $(La_{0.8}Sr_{0.2})FeO_3$

| Sample No. | Maximum Value Standard Deviation at A site | Maximum Value Standard Deviation at B site | Deterioration Rate (%/1000 hr) | Evaluation Result |
| --- | --- | --- | --- | --- |
| 11 | 5.74 | 4.16 | 0.34 | Good |
| 12 | 4.28 | 3.25 | 0.42 | Good |
| 13 | 7.91 | 3.68 | 0.55 | Good |
| 14 | 10.95 | 4.98 | 1.23 | Poor |
| 15 | 1.73 | 0.65 | 0.32 | Good |
| 16 | 0.43 | 0.21 | 0.22 | Good |

TABLE 10

Concentration Analysis Result for 10 Spots on Cathode configured from Sample No. 11 of $(La_{0.8}Sr_{0.2})FeO_3$

| Analysis Spot | La(mol %) | Sr(mol %) | Fe(mol %) |
| --- | --- | --- | --- |
| 1 | 39.1 | 9.3 | 58.6 |
| 2 | 45.3 | 9.8 | 46.9 |
| 3 | 33.3 | 11.3 | 51.2 |
| 4 | 38.1 | 8.6 | 44.4 |
| 5 | 42.1 | 12.1 | 48.9 |
| 6 | 36.9 | 7.9 | 55.8 |
| 7 | 44.4 | 7.6 | 46.3 |
| 8 | 41.2 | 8.7 | 51.2 |
| 9 | 39.6 | 10.3 | 52.6 |
| 10 | 33.8 | 11.3 | 51.8 |
| Average Value | 39.38 | 9.69 | 50.77 |
| Standard Deviation | 3.83 | 1.46 | 4.13 |

TABLE 11

Additive Content Amount and Maximum Value of Standard Deviation for Cathode configured from Sample No. 11 to No. 16 of $(La_{0.8}Sr_{0.2})FeO_3$

| Sample No. | Standard Deviation | | | Additive Content Amount (ppm) | | |
| --- | --- | --- | --- | --- | --- | --- |
| | A Site | | B Site | | | |
| | La | Sr | Fe | P | Cr | B |
| 11 | 3.83 | 1.46 | 4.13 | 20 | 100 | 10 |
| 12 | 4.44 | 3.02 | 3.33 | 30 | 300 | 20 |
| 13 | 8.15 | 2.55 | 3.58 | 50 | 500 | 50 |
| 14 | 11.2 | 2.98 | 5.11 | 60 | 550 | 70 |
| 15 | 1.25 | 1.89 | 0.88 | 20 | 80 | 10 |
| 16 | 0.59 | 0.12 | 0.25 | 10 | 30 | 5 |

TABLE 12

Evaluation Result of Deterioration Rate and Maximum
Value of Standard Deviation for Cathode configured from Sample No.
11 to No. 16 of $(La_{0.8}Sr_{0.2})FeO_3$

| Sample No. | Maximum Value Standard Deviation at A site | Maximum Value Standard Deviation at B site | Deterioration Rate (%/1000 hr) | Evaluation Result |
|---|---|---|---|---|
| 11 | 3.83 | 4.13 | 0.34 | Good |
| 12 | 4.44 | 3.33 | 0.42 | Good |
| 13 | 8.15 | 3.58 | 0.55 | Good |
| 14 | 11.2 | 5.11 | 1.23 | Poor |
| 15 | 1.89 | 0.88 | 0.32 | Good |
| 16 | 0.59 | 0.25 | 0.22 | Good |

As illustrated in Table 7 to Table 9, the deterioration rate was suppressed to a small value for samples No. 11 to No. 13, No. 15 and No. 16. These samples exhibit a standard deviation (scattering) for the atomic percentage of elements at the A site of no more than 7.91, and the standard deviation for the atomic percentage of elements at the B site was no more than 4.16.

As shown by Table 10 to Table 12, the deterioration rate is reduced by a large extent on the cathode configured from samples No. 11 to No. 13 and No. 15 to No. 16. In these cathodes, the standard deviation of the atomic percentage of each element at the A site is less than 11.2, and more specifically, is less than or equal to 8.15. The standard deviation of the atomic percentage of each element at the B site is less than or equal to 4.13.

In sample No. 14 which exhibited a large deterioration rate, the standard deviation for the atomic percentage of elements at the A site was at least 10.95. In sample No. 14, the standard deviation for the atomic percentage of elements at the B site was comparatively large at 4.98.

In cathodes configured by sample No. 14 in which the deterioration rate was increased, the standard deviation of the atomic percentage of each element at the A site is 11.2, and the standard deviation of the atomic percentage of each element at the B site is 5.11.

C-3 No. 17 to No. 22: $La(Ni_{0.6}Fe_{0.4})O_3$

In relation to the samples No. 17 to No. 22, the measurement results using the concentration of No. 17 sample as an example, and the results of the calculation of the average value and the standard deviation are shown in Table 13. Table 14 shows the maximum value of the standard deviation for the atomic percentage of each element in relation to samples No. 17 to No. 22. The maximum value of the standard deviation at the A site and the maximum value of the standard deviation at the B site are underlined in relation to each sample. Table 15 shows the maximum value of the standard deviation at the A site and the maximum, value of the standard deviation at the B site shown in Table 14, the voltage drop rate (deterioration rate) per 1000 hours, and the evaluation results based on the voltage drop rate for samples No. 17 to No. 22.

Table 16 shows the measurement results for the concentration and the calculation results for the average value and standard deviation at the sectional surface of the cathode according to sample No. 17 of the samples No. 17 to No. 22. Table 17 shows the maximum value of the standard deviation value of the atomic percentage of each element for the cathode according to No. 17 to No. 22. In Table 17, an underline is applied to the maximum value for the standard deviation value at the A site and the maximum value for the standard deviation value at the B site. Table 18 shows the maximum value of the standard deviation at the A site and the maximum value of the standard deviation at the B site shown in Table 17, the voltage drop rate (deterioration rate) per 1000 hours, and the evaluation results based on the voltage drop rate for the cathode according to samples No. 17 to No. 22.

TABLE 13

Concentration Analysis Results for 10 Spots
in Sample No. 17 of $La(Ni_{0.6}Fe_{0.4})O_3$

| Analysis Point | La (mol %) | Ni (mol %) | Fe (mol %) |
|---|---|---|---|
| 1 | 40.3 | 28.7 | 31.0 |
| 2 | 37.4 | 33.9 | 28.7 |
| 3 | 48.7 | 31.5 | 19.8 |
| 4 | 58.1 | 25.4 | 16.5 |
| 5 | 41.8 | 32.0 | 26.2 |
| 6 | 40.9 | 34.8 | 24.3 |
| 7 | 42.1 | 29.9 | 28.0 |
| 8 | 59.2 | 23.9 | 16.9 |
| 9 | 35.7 | 36.4 | 27.9 |
| 10 | 47.9 | 28.9 | 23.2 |
| Average Value | 45.21 | 30.54 | 24.25 |
| Standard Deviation | 7.72 | 3.79 | 4.81 |

TABLE 14

Maximum Value for Standard Deviation and Additive Content
Amount for Samples No. 17 to No. 22 of $La(Ni_{0.6}Fe_{0.4})O_3$

| Sample No. | Synthesis Method | Standard Deviation | | | Additive content amount (ppm) | | |
|---|---|---|---|---|---|---|---|
| | | A site La | B site Ni | Fe | P | Cr | B |
| 17 | Solid phase method | <u>7.72</u> | 3.79 | <u>4.81</u> | 40 | 400 | 50 |
| 18 | Solid phase method | <u>10.5</u> | <u>6.35</u> | 1.23 | 60 | 600 | 60 |
| 19 | Solid phase method | <u>5.23</u> | <u>4.35</u> | 2.35 | 50 | 500 | 30 |
| 20 | Solid phase method | <u>3.52</u> | <u>4.23</u> | 1.85 | 30 | 250 | 20 |
| 21 | Liquid phase method | 1.35 | <u>1.23</u> | 0.85 | 20 | 100 | 10 |
| 22 | Liquid phase method | <u>0.35</u> | 0.33 | <u>0.36</u> | 10 | 50 | 5 |

TABLE 15

Evaluation Result for Deterioration Rate and
Maximum Value of Standard Deviation in Samples No. 17 to No. 22 of $La(Ni_{0.6}Fe_{0.4})O_3$

| Sample No. | Maximum Value Standard Deviation at A site | Maximum Value Standard Deviation at B site | Deterioration Rate (%/1000 hr) | Evaluation Result |
|---|---|---|---|---|
| 17 | 7.72 | 4.81 | 0.78 | Good |
| 18 | 10.5 | 6.35 | 1.65 | Poor |
| 19 | 5.23 | 4.35 | 0.75 | Good |
| 20 | 3.52 | 4.23 | 0.68 | Good |
| 21 | 1.35 | 1.23 | 0.46 | Good |
| 22 | 0.35 | 0.36 | 0.45 | Good |

TABLE 16

Concentration Analysis Result for 10 Spots on Cathode configured from Sample No. 17 of $La(Ni_{0.6}Fe_{0.4})O_3$

| Analysis Spot | La(mol %) | Ni(mol %) | Fe(mol %) |
|---|---|---|---|
| 1 | 41.6 | 31.2 | 28.6 |
| 2 | 33.6 | 36.3 | 19.6 |
| 3 | 46.3 | 30.3 | 22.2 |
| 4 | 41.3 | 22.2 | 26.5 |
| 5 | 56.5 | 23.6 | 28.6 |
| 6 | 44.3 | 38.6 | 18.6 |
| 7 | 38.5 | 31.2 | 23.6 |
| 8 | 55.1 | 33.3 | 27.4 |
| 9 | 46.5 | 25.6 | 21.6 |
| 10 | 42.5 | 32.5 | 20.6 |
| Average Value | 44.62 | 30.48 | 23.73 |
| Standard Deviation | 6.64 | 5.03 | 3.59 |

TABLE 17

Additive Content Amount and Maximum Value of Standard Deviation for Cathode configured from Sample No. 17 to No. 22 of $La(Ni_{0.6}Fe_{0.4})O_3$

| Sample No. | Standard Deviation A Site La | B Site Ni | Fe | Additive Content Amount (ppm) P | Cr | B |
|---|---|---|---|---|---|---|
| 17 | 6.64 | 5.03 | 3.59 | 40 | 400 | 50 |
| 18 | 10.8 | 6.26 | 1.65 | 60 | 600 | 60 |
| 19 | 4.89 | 4.12 | 2.12 | 50 | 500 | 30 |
| 20 | 3.02 | 3.99 | 2.01 | 30 | 250 | 20 |
| 21 | 1.89 | 1.65 | 1.13 | 20 | 100 | 10 |
| 22 | 0.38 | 0.42 | 0.45 | 10 | 50 | 5 |

TABLE 18

Evaluation Result of Deterioration Rate and Maximum Value of Standard Deviation for Cathode configured from Sample No. 17 to No. 22 of $La(Ni_{0.6}Fe_{0.4})O_3$

| Sample No. | Maximum Value Standard Deviation at A site | Maximum Value Standard Deviation at B site | Deterioration Rate (%/1000 hr) | Evaluation Result |
|---|---|---|---|---|
| 17 | 6.64 | 5.03 | 0.78 | Good |
| 18 | 10.8 | 6.26 | 1.65 | Poor |
| 19 | 4.89 | 4.12 | 0.75 | Good |
| 20 | 3.02 | 3.99 | 0.68 | Good |
| 21 | 1.89 | 1.65 | 0.46 | Good |
| 22 | 0.38 | 0.45 | 0.45 | Good |

As illustrated in Table 13 to Table 15, the deterioration rate was suppressed to a small value for samples No. 17, No. 19 to No. 22. These samples exhibit a standard deviation (scattering) for the atomic percentage of elements at the A site of no more than 7.72. These samples exhibit the standard deviation for the atomic percentage of elements at the B site was no more than 4.81.

As shown by Table 16 to Table 15, the deterioration rate is reduced by a large extent on the cathode configured from samples No. 17 and No. 19 to No. 22. In these cathodes, the standard deviation of the atomic percentage of each element at the A site is less than 10.8, and more specifically, is less than or equal to 6.64. The standard deviation of the atomic percentage of each element at the B site is less than or equal to 5.03.

On the other hand, the standard deviation for the atomic percentage of elements at the A site in sample No. 18 which exhibited a large deterioration rate was relatively large at 10.5, and the standard deviation for the atomic percentage of elements at the B site was also comparatively large at 6.35.

In cathodes configured by sample No. 18 in which the deterioration rate was increased, the standard deviation of the atomic percentage of each element at the A site is 10.8, and the standard deviation of the atomic percentage of each element at the B site is 6.26.

C-4 No. 23 to No. 28: $(La_{0.6}Sr_{0.4})(Co_{0.2}Fe_{0.8})O_3$

Table 10 shows the measurement results for the voltage drop rate (deterioration rate) per 1000 hours and the concentration of the additive (P, Cr and B) for Samples No. 23 to No. 28.

TABLE 19

| Sample No. | Synthesis Method | Additive content amount (ppm) P | Cr | B | Deterioration Rate (%/1000 hr) | Evaluation Result |
|---|---|---|---|---|---|---|
| 23 | Solid phase method | 60 | 530 | 75 | 1.66 | Poor (x) |
| 24 | Liquid phase method | 50 | 500 | 50 | 0.65 | Good (o) |
| 25 | Solid phase method | 40 | 250 | 25 | 0.56 | Good (o) |
| 26 | Liquid phase method | 30 | 100 | 10 | 0.38 | Good (◎) |
| 27 | Liquid phase method | 15 | 65 | 5 | 0.23 | Good (◎) |
| 28 | Liquid phase method | less than 1 | less than 1 | less than 1 | 1.23 | Poor (x) |

As illustrated in Table 19, the deterioration rate was not suppressed to a small value in sample No. 28. Therefore, it is determined that addition of at least 1 ppm of all of P, Cr and B to the cathode material is preferred. In the same manner, it is determined that the addition of all of P, Cr and B at least 1 ppm to the cathode is preferred.

The deterioration rate was not suppressed to a small value in relation to sample No. 23. Therefore it was confirmed that the preferred content amount in the electrode material of P is no more than 50 ppm, the preferred content amount in the cathode material of Cr is no more than 500 ppm, and the preferred content amount in the electrode material of B is no more than 50 ppm. In the same manner, it is confirmed that a content amount of P in the cathode of less than or equal to 50 ppm, a content amount of Cr of less than or equal to 500 ppm, and a content amount of B of less than or equal to 50 ppm are preferred.

A comparison of No. 24, 25 and No. 26, 27 enables confirmation that the preferred content amount in the electrode material of P is no more than 30 ppm, the preferred content amount in the cathode material of Cr is no more than 100 ppm, and the preferred content amount in the electrode material of B is no more than 10 ppm. In the same manner, it is confirmed that a content amount of P in the cathode of less than or equal to 30 ppm, a content amount of Cr of less than or equal to 100 ppm, and a content amount of B of less than or equal to 10 ppm are more preferred.

C-5 Summary

From the above results, the deterioration of the cathode can be suppressed by a relatively uniform, configuration in the distribution of atoms (small standard deviation) in the cathode and the cathode material.

It was confirmed that the content amount of additives (P, Cr and B) contained in the cathode and the cathode material results in a small standard deviation when 1 ppm≤P≤50 ppm, 1 ppm≤Cr≤500 ppm and 1 ppm≤B≤50 ppm.

From the point of view of a stable microstructure in a porous electrode, the content amount of additives (P, Cr and B) contained in the cathode and the cathode material has been confirmed to be 1 ppm≤P≤30 ppm, 1 ppm≤Cr≤100 ppm and 1 ppm≤B≤10 ppm. These results demonstrate an effect of strengthening of the backbone of a porous electrode by addition of a microscopic amount of the additives.

Wet assay (ICP analysis) was used to confirm that the macro composition of each sample coincides with the well-formed composition of the raw materials.

The relationship between the atomic distribution and the deterioration of the cathode is purported to be as follows.

Even when the overall composition of the powdered cathode material coincides with the well-formed composition, if the location (distribution) of respective elements is not uniform when the micro-portions are observed, the composition of those portions deviates from the overall composition. Catalytic activity and conductivity is low in such portions, and thereby a cathodic function during power generation operations is low. When operating, as a fuel cell current flow tends to avoid such inactive portions, and thereby the current density is increased in the periphery of such portions. As the result, the deterioration of such peripheral portions is accelerated.

Although the scattering of the atomic percentage was calculated, in each table by use of a disintegrated product, since the spot diameter during analysis, for a powdered material is smaller than the diameter of a disintegrated product, it was confirmed for all materials that there is no difference in relation to the atomic distribution configuration (scattering) from a disintegrated product.

The technique disclosed herein is useful in relation to a solid oxide fuel cell to thereby suppress deterioration of the cathode.

What is claimed is:

1. A solid oxide fuel cell comprising:
   a. cathode including a complex oxide having a perovskite structure expressed by the formula $ABO_3$,
   an anode, and
   a solid electrolyte layer disposed between the cathode and the anode, wherein:
   the cathode includes phosphorus, chromium and boron,
   a content amount of the phosphorus in the cathode is at least 10 ppm and no more than 50 ppm,
   a content amount of the chromium in the cathode is at least 50 ppm and no more than 500 ppm,
   a content amount of the boron in the cathode is at least 5 ppm and no more than 50 ppm, and
   the cathode has a uniform composition distribution throughout the cathode including an outer surface and an inner body of the cathode.

2. The solid oxide fuel cell according to claim 1, wherein the content amount of the phosphorus in the cathode is at least 10 ppm and no more than 30 ppm.

3. The solid oxide fuel cell according to claim 1, wherein the content amount of the chromium in the cathode is at least 50 ppm and no more than 100 ppm.

4. The solid oxide fuel cell according to claim 1, wherein the content amount of the boron in the cathode is at least 5 ppm and no more than 10 ppm.

5. The solid oxide fuel cell according to claim 2, wherein the content amount of the chromium in the cathode is at least 50 ppm and no more than 100 ppm.

6. The solid oxide fuel cell according to claim 2, wherein the content amount of the boron in the cathode is at least 5 ppm and no more than 10 ppm.

7. The solid oxide fuel cell according to claim 3, wherein the content amount of the boron in the cathode is at least 5 ppm and no more than 10 ppm.

* * * * *